Oct. 19, 1948.   J. A. CROWLEY, JR   2,451,924
APPARATUS FOR CONTACTING SOLIDS
WITH GASEOUS REACTANTS
Filed July 13, 1944
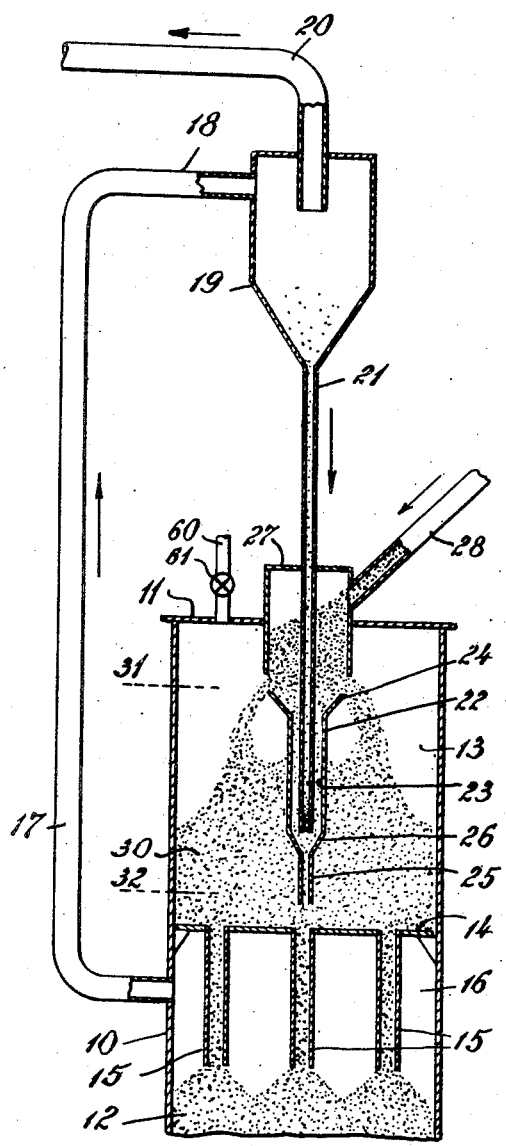
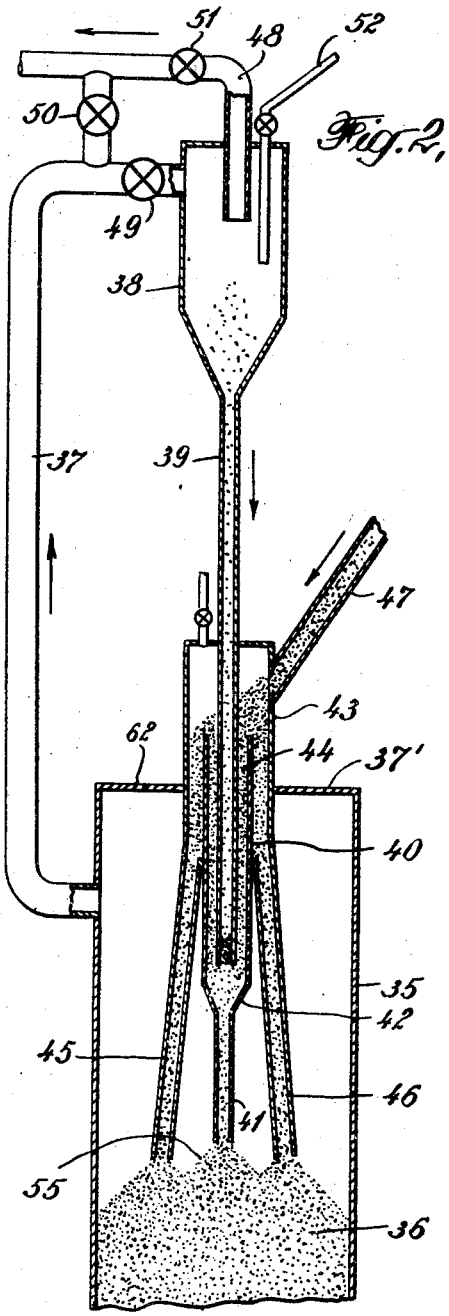
INVENTOR
John A. Crowley Jr.
BY
ATTORNEY

Patented Oct. 19, 1948

2,451,924

UNITED STATES PATENT OFFICE 2,451,924

APPARATUS FOR CONTACTING SOLIDS WITH GASEOUS REACTANTS

John A. Crowley, Jr., Scarsdale, N. Y., assignor to Socony-Vacuum Oil Company, Incorporated, a corporation of New York Application July 13, 1944, Serial No. 544,782

8 Claims. (Cl. 23—288)

This invention has to do with apparatus for accomplishing the introduction of particle form solid material to vessels wherein gaseous reactants are contacted with moving particle form solid material which may, or may not be catalytic in nature. Typical of the processes to which the invention may be applied is the cyclic process for cracking conversion of hydrocarbons. It is well known that gas oils boiling between temperatures of the order of 450° F. – 750° F. may be converted to gas, gasoline and other products by passing them at reaction conditions of temperature of the order of 800° F. and higher and of pressure somewhat above atmospheric in contact with a solid adsorptive catalytic contact mass material. Usually such contact mass materials partake of the nature of natural or treated clays or synthetic associations of silica, alumina or silica and alumina, any of which may have other constituents added such as certain metallic oxides. The process has recently been developed as one wherein a particle form solid contact mass material is passed cyclically through two vessels, in the first of which it is contacted with hydrocarbon vapors for the purpose of conversion and in the second of which it is contacted with a combustion supporting gas, such as air, for the purpose of burning therefrom a carbonaceous contaminant deposited during said hydrocarbon conversion. The cyclic transfer of the contact material from one zone to the other, generally involves the use of elevator or other well known particle form solid material conveyors and the use of surge hoppers or zones above the reaction and regeneration vessels. A substantially continuous bed of contact material is maintained in these surge zones and the levels of the surface of such beds in said surge zones are controlled within set limits by the use of flow throttling devices, inserted in the contact material exit pipes from the reactor and regenerator vessels, or by other means well known. In its cyclic travel through such a system, as above described, the particle form contact material is subject to a limited amount of attrition, which results in the gradual decrease in size of some of the particles of contact material and in the gradual accumulation in the mass of particle form contact material of a certain amount of undersized contact material, the presence of too much of which is detrimental to the satisfactory operation of the process. Certain amounts of this undersized contact material along with small quantities of contact material of suitable size for further use may be entrained in the effluent gas from the conversion and regeneration vessels of the cyclic system hereinabove described. In one form of this process, it has been found desirable to separate substantially all the solid material entrained from the conversion vessel from the gaseous conversion products and to return it to the cyclic system. It has also been found desirable to effect a separation of the usable sized portion of the contact material entrained from the regenerator vessel from the effluent gas and to return this portion to the regenerator vessel; and to subsequently separate the remaining or undersized contact material from the effluent gas and exclude this from the cyclic system. This invention is specifically directed to apparatus for accomplishing the transfer of such separated solid material from the chamber in which it was separated from a gas to a chamber therebelow, such as a conversion or regeneration vessel, or a surge hopper associated therewith, which second chamber may be operated under a gaseous pressure, either above or below that in the separator.

Several difficulties have been encountered which seriously complicate the problem of returning or introducing particle form solid material into such zones as the hereinbefore mentioned surge hopper located above a regeneration vessel. The function of the surge hopper is principally the maintenance of an accumulation or bed of solid material above the regeneration vessel which may serve as a constant source of solid material supply for the regeneration vessel and act as a buffer for fluctuations in the rate of solid material flow to and from the regeneration vessel.

The bed of contact material therein is constantly replenished with spent contact material from the reaction vessel of the cyclic system, but the level of the surface of said bed is subject to a certain amount of fluctuations. Generally, a variable efficiency cyclone separator of the general type used in conjunction with Raymond Mills may be conveniently used to effect the separation of usable sized contact material particles from the regenerator effluent gas and undersized solid particles also entrained thereby. The proper operation of such separators is in part dependent upon the prevention of substantial vertical gas flow through the usually conical shaped solid material drain section thereof and drain pipe therebelow. Moreover, it is often undesirable for other reasons to permit substantial interflow of gas between such a separator and a surge hopper into which the separated solid material is to pass. For example, it is sometimes desirable to vent the surge hopper to the atmosphere to permit proper flow of solid material thereto from a conveyor discharge. If gas from the separator, which may be operating under a higher pressure, is permitted to pass in large quantities into the surge hopper, it will cause interference with the flow of the main stream of solid material to the surge hopper and entrain considerable quantities of dust from the hopper vent. It is, of course, obvious, that if the gas happens to be explosive or inflammable in nature, its substantial exclusion from such a surge hopper is imperative. The maintenance of a leg of the separated solid material particles in the drain pipe between the separator and surge hopper, would serve as a seal to substantially prevent the flow of gas through said drain pipe. The maintenance of such a leg is difficult of attainment, because the rate of solid material entrainment from the regenerator and its separation in the separator have been found to fluctuate widely during short periods of time. Consequently, any attempt to maintain a constant level leg of solid material in the separator drain pipe by throttling the flow from the drain pipe, results either in loss of the leg entirely or accumulation of solid material in the separator itself, thereby rendering its operation ineffectual. An apparent remedy would be the location of the discharge end of the drain pipe below the surface of the bed of solid material in the surge hopper and permitting free flow of solid material from the drain pipe into said bed, the bed itself serving as a gas seal above and below the discharge end of the drain pipe. Since, however, the level of the surface of the bed in the surge hopper is subject to fluctuations, it would only effectively operate as a gas seal when the level happened to be high and completely fail when the level is low. Moreover, in some applications, such as when the separated solid material is to be directly returned to a column of solid material maintained in a reaction or regeneration vessel itself, it is not always possible to effectuate free flow of solid material from the discharge end of a drain pipe located under the surface of the solid material column.

A major object of this invention is the provision of a means for passage of particle form solid material from an elevated vessel to a second vessel located therebelow, operating under a different gaseous pressure than said first named vessel, while substantially preventing the flow of gas through said passage means. A specific object of this invention is the provision of an apparatus in a system of the type hereinabove described, for conducting particle form solid material from a solid-gas separating chamber to a second chamber therebelow, wherein is maintained a bed fluctuating depth of downwardly moving particle form solid material, while substantially preventing the interflow of gas between said two chambers. Another object of this invention is the provision of an apparatus for introducing particle form solid material of two types into a vessel wherein said solid material is contacted with a gas for the purpose of treatment. These and other objects of this invention will become apparent from the following description of the invention.

In order to better understand the invention, reference should be made now to the attached drawings, of which Figure 1 is an elevational view, partially in section, showing a preferred form of the apparatus as applied to a regenerator surge chamber, and Figure 2 is a similar view of a modified form of the invention, as applied to the introduction of solid material directly into a reaction or regeneration vessel. Both of these drawings are highly diagrammatic in form.

Turning now to Figure 1, we find the shell 10 defining a regeneration zone 12, of which only the upper end is shown, and a surge chamber 13 thereabove, which is separated from the regeneration zone by means of a partition 14. Such zones may be of any practical cross-sectional shape. Uniformly spaced pipes 15 depend from the partition 14 and serve as means for solid material passage from the surge chamber to the regeneration zone and also to form a gas solid disengaging space 16, from which spent regeneration gas may be withdrawn from the regenerator through conduit 17. The effluent gas passes through conduit 17 into conduit 18 and then into the cyclone separator 19, which is only diagrammatically shown and may be of a variable efficiency type. The separator is provided with a gas outlet pipe 20 and a separated solid material drain pipe 21. The drain pipe 21 extends vertically downward through the top 11 of the surge chamber and terminates within said surge chamber. Concentrically positioned along the lower section of the pipe 21 is the pipe 22 which terminates near the lower end of pipe 21 on one end and in the upper portion of the surge chamber on its other end. The pipe 22 is of substantially greater internal cross-section than the pipe 21, thereby providing a space 23 between said pipes. The pipe 22 is provided with a flared section 24 on its upper end to direct solid material into the space 23, as will be hereinafter shown. A third pipe 25 is positioned axially below the lower ends of pipes 21 and 22 and is connected on its upper end by swedged section 26 to the lower end of pipe 22. The pipe 25 terminates near the bottom of the chamber 13 and directly over a drain pipe 15 leading to the regeneration zone. The cross-section of the pipe 25 is substantially less than that of the space 23 between pipes 21 and 22. A pipe 27 of substantially greater cross-section than pipe 22 is positioned through the top 11 of the chamber 13 directly over the pipe 22. This pipe is closed on its upper end, as shown, although not necessarily so and terminates on its lower end directly above the flared portion 24 of pipe 22. A conduit 28 is connected into the pipe 27 for admittance of the particle form solid material charge to the regenerator surge chamber. A vent pipe 60 with valve 61 thereon is provided on the top of the chamber 13 to permit maintenance of atmospheric pressure in the chamber, if desired.

In operation, effluent gas from the regeneration zone containing small quantities of entrained solid contact material is passed through conduits 17 and 18 into the cyclone separator 19, which is so adjusted, as regards separation efficiency, to permit separation from the gas of at least most of the usable sized solid material. The gas containing the smaller sized solid material passes from the separator through conduct 20 and may then pasS through a second separator for further solid separation before release to the atmosphere. The separated solid material passes downwardly through pipe 21 and then through pipe 25, from which it passes into the bed of solid material in the chamber 13 directly above the drain pipe 15. It then passes along with other solid material from said bed through pipe 15 to the regeneration zone 12 below, in which is maintained a substantially compact column of downwardly moving particle form solid contact material. The main solid contact material charge passes through conduit 28 into the pipe 27 from which it is directed downwardly over the upper end of the space 23, thereby maintaining said space filled with solid material. The overflow of solid material drops to the surface of the bed 30. It has been found that by proper positioning of the inlet to pipe 25 directly and centrally below the discharge end of pipe 21, the solid material from pipe 21 will flow into pipe 25 preferentially to the solid material from the space 23. The pipe 25 is of sufficient size to permit a flow therethrough of not only all of the relatively small amount of material from pipe 21 but also some material from space 23. On the other hand, the pipe 25 is of insufficient capacity to handle all the solid material that could ordinarily flow through the space 23, which is of larger cross-section. Consequently, the pipe 21 is maintained substantially drained of solid material and the column of solid material in space 23 extending above the lower end of pipe 21 and the column of solid material passing through the pipe 25 extending below the lower end of pipe 21 serve as constantly maintained gas seals which substantially prevent the interflow of gases between separator 19 and chamber 13. It will be seen that the gas seal thus provided is independent of the level of the surface of the bed of solid material in chamber 13, which may ordinarily fluctuate between the lines 31 and 32. The proper location of the discharge end of pipe 25 within the bed 30 is of considerable importance. Due to the relatively large cross-section of the bed 30, the linear rate of downward solid material movement in the bed at points located a substantial distance above the partition 14 may be considerably lower than that required in the pipe 25. The same may be true at points located very close to the partition 14 and between the drain pipes 15. It has been found that when particle form solid material is introduced into a downwardly moving bed of similar solid material, through a pipe, such as pipe 25, the linear rate of flow in the pipe 25 will be throttled by the bed to substantially the linear rate of flow in the bed adjacent the discharge end of the pipe. Consequently, it is important to locate the discharge end of the pipe 25 at a point in the bed where the linear rate of solid flow in the bed is at least equal to that linear rate of solid flow through the pipe 25, which will correspond to a volumetric throughput rate amounting to all the solid material flow from the separator 19 plus an additional flow from space 23. In the particular arrangement shown, a location near and directly above any of the drain pipes 15 adequately meets this requirement.

As has been stated hereinabove, the apparatus may also be used for return of solid material to the surface of a column of solid material within the regeneration or reaction vessel itself. Such an arrangement is shown in Figure 2. In this drawing is shown the upper section of a reaction vessel 35, in which is maintained a substantially compact column 36 of downwardly flowing particle form contact material. A gas outlet conduit 37 is provided near the upper end of the vessel 35 and a cyclone separator 38 is located above the vessel. The separator is provided with gas outlet conduit 48 and solid material drain pipe 39, which extends down through the top 62 of the vessel 35 and terminates in the upper section thereof, above the column of solid material. A concentrically positioned pipe 40, of larger cross-section, extends along the lower section of pipe 39 and terminates near the lower end thereof. A pipe 41 is positioned axially below the pipes 39 and 40 and is connected through connecting nipple 42 to the lower end of pipe 40. The size relationships and positioning of the pipes 39, 40 and 41 are in general similar to the relationships described for pipes 21, 22 and 25 of Figure 1. A pipe 43, somewhat larger in cross-section than pipe 40 is positioned concentrically therewith, extending above and below the upper end of said pipe 40. This pipe is closed off around pipe 40, at its lower end, and drain pipes 45 and 46 connect through this closed lower end and extend downwardly to a location within the vessel 35, just below the lower end of pipe 41. A conduit 47 is connected into the pipe 43 near its upper end for admittance of the solid material charge to vessel 35.

In operation, reactant gases are passed upwardly through the column of particle form solid contact material in vessel 35 and are withdrawn from vessel 35 through conduit 37 along with certain amounts of entrained solid material. The gas passes through the separator wherein all or part of the solid material is separated therefrom and then the gas passes from the separator through conduit 48. Separated solid material passes downwardly through pipe 39 and then through pipe 41 onto the surface 55 of the column of solid material in vessel 35. Particle form solid material charge to the vessel 35 passes through conduit 47 into pipe 43 wherein a portion of the solid material is diverted into the space 44 between pipes 39 and 40 and the overflow passes from the closed lower end of pipe 43 through pipes, such as 45 and 46, which deliver the solid material onto the surface of the column of solid material 36. By control of the rate of flow of solid material from the lower end of the reaction vessel (not shown) the surface of the column of solid material within said vessel 35 is maintained at the level of the discharge ends of pipes 45 and 46, the surface being built up at the center of the vessel to the level of the discharge end of pipe 41. By so positioning the discharge ends of pipes 45 and 46 slightly below that of pipe 41, a throttled flow of solid material is permitted from pipe 41, which is volumetrically greater than the total volume of solid material separated in the separator 38. Thus, as in the previously described apparatus, the drain pipe 39 is maintained substantially drained, thereby preventing any chance of solid material accumulation in the separator 38; and seal columns of solid material in space 44 and in pipe 41 are provided to substantially prevent gas flow in pipe 39 between the separator 38 and vessel 35.

The apparatus may be optionally used as a means for introducing solid material particles of two types to a conversion vessel in a system wherein both of said of said solid materials are contacted with reactant vapors for somewhat different purposes, after which said solid may be separated for separate treatments and then again returned to the reaction vessel. Thus by closing valves 49 and 51 and opening valve 50, in the vapor conduit system, the effluent vapors from the reaction vessel may be caused to by-pass the vessel 38 and it may be used as a charge hopper for solid material of one type. Solid material of one type would pass to the vessel 38, through pipe 52 and then pass through pipes 39 and 41 to the reaction vessel. Solid material of a second type would be admitted to the reaction vessel through pipe 47 as hereinbefore described.

The apparatus of this invention may be used, as described, for the transfer of solid material between two superposed vessels wherein different gaseous pressures are maintained regardless of whether the pressure in the uppermost vessel is higher or lower than that in the lowermost vessel. Referring to Figure 2, the required vertical length of the space 44 and the pipe 41 wherein the seal columns of the particle form solid material are maintained will be largely dependent upon the difference in the pressure between the vessel 38 and vessel 35. The required lengths of these columns will also be partially dependent upon the size, shape and density of the particle form solid material involved. As an example of a particular application of the invention, wherein a clay-type catalyst of about 20 to 40 mesh particle size and density of about 40 pounds per cubic foot was used and wherein the pressure differential between the two vessels was of the order of one-half pound per square inch, it was found that when the length of the space 44 and of the pipe 41 were each approximately three feet, the amount of gas flow occurring through pipe 39 was adequately restricted. In general, the invention should be limited to applications wherein the difference in gas pressure between the two vessels is of the order of 0.1 to 2 pounds p. s. i.

It should be understood that the attached drawings and the description of the apparatus of this invention and of its applications are merely exemplary in character and are not intended as limitations of the scope of the invention.

I claim:

1. Apparatus for transferring a particle form solid from a first vessel to a second vessel therebelow maintained under different pressures which comprises, said first vessel, said second vessel located beneath said first named vessel, a vertically arranged funnel-forming member in the upper part of said second vessel, the upper portion of said funnel-forming member being tubular along at least a major part of its length and the lower portion of said funnel-forming member comprising a tubular outlet of substantially less diameter than said upper portion, a conduit extending from the bottom of said first vessel into the tubular upper portion of said funnel-forming member and terminating on its open unrestricted lower end a substantial distance below the upper end of said funnel-forming member but above said tubular outlet, said conduit being of substantially less diameter than said tubular upper portion of said funnel-forming member and being substantially concentric therewith, and separate passage defining means arranged to guide additional contact material into the upper end of said funnel-forming member.

2. Apparatus for transferring a particle form solid from a first vessel to a second vessel maintained under different gaseous pressures comprising: said first vessel, said second vessel located below said first named vessel, a conduit extending substantially vertically downward from the lower section of said first vessel to a location within and substantially below the upper end of said first vessel, said conduit being open and unrestricted on its lower end, a second conduit member of substantially greater diameter than said first conduit positioned concentric therewith and extending only along a lower portion of the length of said first conduit, said second conduit being open on its upper end and terminating within said second vessel near the lower end of said first conduit, a closure member on the lower end of said second conduit and an outlet from the bottom of said closure member located axially with said first and second conduits and being of substantially less diameter than said second conduit, a separate contact material supply conduit extending upwardly from its open lower end which lower end is at a location spaced substantially above the upper end of said second conduit and arranged to guide at least a portion of the contact material flowing therein into the open upper end of said second conduit.

3. A gas-solid contacting apparatus comprising in combination, a contacting vessel adapted to confine a compact gravitating column of solid contact material particles a gas-solid separator positioned above said contacting vessel, a gas outlet conduit leading from said contacting vessel to said separator, a vertically arranged funnel-forming member extending downwardly in the upper portion of said contacting vessel, the upper section of said funnel-forming member being tubular along at least a major part of its length and the lower section of said funnel-forming member comprising a tubular outlet of substantially less diameter than said upper section, a conduit extending substantially vertically downward from the bottom of said separator into said upper section of said funnel-forming member and terminating a substantial distance below the upper end thereof but above said tubular outlet, said last named conduit being of substantially less diameter than said upper section of said funnel-forming member and substantially concentric therewith, and an upwardly extending, separate solid supply conduit terminating on its open lower end at a location substantially spaced above the upper end of said funnel-forming member and arranged to guide at least a portion of the contact material flowing therein into the open upper end of said funnel-forming member.

4. An apparatus for contacting gases with a moving substantially compact column of solid material comprising: a contacting vessel adapted for confining a gravitating column of particle form solids, a gas-solid separator located above said vessel, a gas outlet from the upper section of said vessel and conduit means connected between said outlet and said separator, a gas outlet on said separator, an elongated tubular receptacle, open on top, extending downwardly within the upper section of said contacting vessel having a tubular delivery outlet positioned centrally on its lower end, said tubular outlet terminating on its lower end still within the upper portion of said vessel and being of substantially less diameter than said receptacle, means at least substantially concentric with said receptacle extending a short distance upwardly beyond the upper end of said receptacle and terminating on its lower end short of the lower end of said receptacle, said means being of greater horizontal dimensions than said receptacle so as to leave a passage space therebetween, a closure on the lower end of said means and conduits extending downwardly from said closure to a level in said vessel shortly below the lower end of said tubular outlet from said receptacle, an inlet into the upper section of said means from outside said vessel for solid supply and a solid drain conduit extending vertically downward from the bottom of said separator, through said means and into said tubular receptacle and concentric therewith.

5. In an apparatus for burning a contaminant deposit from a moving mass of particle form solid contact mass material by the action of a combustion supporting gas in which apparatus spent contact mass material is supplied from a bed of fluctuating depth of downwardly moving solid material maintained in a surge chamber through a plurality of outlets in the bottom of said surge chamber to a confined regeneration chamber therebelow and in which apparatus effluent gas from said confined regeneration chamber is passed along with small amounts of entrained solid contact material to a separator located above said surge chamber for the purpose of separation of at least the larger solid material particles from said gas, an apparatus for transferring the separated solid material to said surge chamber at a rate sufficient to prevent accumulation thereof in said separator while substantially preventing the interflow of gas between said separator and surge chamber comprising: said surge chamber, with a plurality of uniformly distributed outlets on its bottom, said separator located above said surge chamber, a substantially vertical pipe extending downwardly from the lower end of said separator to a location at an intermediate level within said surge chamber, an elongated tubular receptacle concentric with and surrounding a lower portion of said conduit within said surge chamber, said receptacle being open on top and being of substantially greater diameter than said conduit, a tubular outlet conduit of substantially less diameter than said receptacle centrally located on the lower end of said receptacle and extending downwardly therefrom to a location shortly above and directly over one of said outlets on the bottom of said surge chamber, passage defining means for solid material supply extending downwardly into the upper end of said surge chamber and terminating a short distance above the open top of said receptacle and arranged to direct part of the solid material passing therethrough into the upper end of said receptacle.

6. An apparatus for contacting two types of particle form solid material with a gas under pressure comprising: a contacting vessel, a feed hopper located above said vessel, an inlet for supply of one type of solid material to said hopper, an elongated vertically arranged tubular receptacle, open on top and closed on bottom, in the upper part of said vessel, a conduit extending substantially vertically downward from the lower end of said hopper into said receptacle and concentric therewith and terminating shortly above the lower end of said receptacle, said conduit being of substantially less diameter than said receptacle so as to leave a vertical, annular passage between said receptacle and said conduit, a tubular outlet connecting into the closed lower end of said receptacle centrally thereof and directly below said conduit, said outlet terminating on its lower end at a level still within the upper part of said vessel and being of less horizontal cross-sectional area than said passage between said conduit and said receptacle, means substantially concentric with said receptacle extending from the roof of said contacting vessel and arranged to guide part of the material delivered thereto into said receptacle and an inlet into said means from outside said contacting vessel.

7. An apparatus for transferring a particle form solid from a first vessel to a second vessel maintained under different pressures comprising: said first vessel, said second vessel located beneath said first named vessel, an elongated vertically arranged tubular receptacle open on its upper end and closed on its lower end, in the upper part of said second vessel, a conduit extending substantially vertically downward from the bottom of said first named vessel into said receptacle and concentric therewith, said conduit terminating substantially below the upper end of said receptacle and being of substantially less horizontal dimension than said receptacle so as to leave a vertical passage for solid flow between said conduit and said receptacle, a centrally positioned outlet for solid material at the lower end of said receptacle directly below said conduit, said outlet having a horizontal cross-sectional area intermediate that of said conduit and said passage for solid flow between said conduit and said receptacle, and means to supply solid material into the upper end of said receptacle.

8. Apparatus for transferring a particle form solid from a first vessel to a second vessel maintained under different pressures which comprises said first vessel, said second vessel located beneath said first named vessel, a vertically arranged funnel-forming member in the upper part of the second vessel having a tubular delivery outlet comprising a portion of restricted cross-section and an upper portion of greater diameter, means at least substantially concentric with said delivery outlet extending from the roof of said second vessel and arranged to guide part of the material delivered thereto into said member, an inlet into said means from outside said second vessel, and a tubular conduit extending from the bottom of said first vessel, through said means and into said upper portion of said delivery outlet of said funnel-forming member and concentric therewith.

JOHN A. CROWLEY, Jr.

REFERENCES CITED

The following references are of record in the file of this patent:

UNITED STATES PATENTS

| Number | Name | Date |
| --- | --- | --- |
| 1,602,705 | Riley et al. | Oct. 12, 1926 |
| 2,226,578 | Payne | Dec. 31, 1940 |